United States Patent
Hanson

(10) Patent No.: US 9,930,755 B1
(45) Date of Patent: Mar. 27, 2018

(54) TRAINING CHILD NIGHT LIGHT

(71) Applicant: Hush Buddy, LLC, Raleigh, NC (US)

(72) Inventor: Scott Hanson, Raleigh, NC (US)

(73) Assignee: Hush Buddy, LLC, Raleigh, NC (US)

( * ) Notice: Subject to any disclaimer, the term of this patent is extended or adjusted under 35 U.S.C. 154(b) by 0 days.

(21) Appl. No.: 15/341,197

(22) Filed: Nov. 2, 2016

(51) Int. Cl.
H05B 37/02 (2006.01)
G09B 5/00 (2006.01)
G09B 11/00 (2006.01)
G10L 25/78 (2013.01)

(52) U.S. Cl.
CPC ........... H05B 37/0236 (2013.01); G09B 5/00 (2013.01); G09B 11/00 (2013.01); H05B 37/0281 (2013.01); G10L 25/78 (2013.01)

(58) Field of Classification Search
CPC ....... F21S 8/035; F21S 6/006; F21V 23/0442; A61B 5/08; A61B 5/11; A61B 2503/04; A61B 2230/63; A63H 3/001; A63H 3/006; Y10S 315/04; Y10S 323/905; H05B 39/083; H05B 37/0236; H05B 37/0281
See application file for complete search history.

(56) References Cited

U.S. PATENT DOCUMENTS

| | | | | |
|---|---|---|---|---|
| 5,307,051 A * | 4/1994 | Sedlmayr | ............... | A63H 3/001 340/540 |
| 6,020,659 A * | 2/2000 | Crowther | ............. | H05B 39/083 307/141.4 |
| 8,398,538 B2 * | 3/2013 | Dothie | ...................... | A61B 5/11 600/26 |
| 9,530,080 B2 * | 12/2016 | Glazer | ................. | H04N 5/2251 |
| 2004/0257814 A1 | 12/2004 | Eusterbrock | | |

* cited by examiner

Primary Examiner — Haissa Philogene
(74) Attorney, Agent, or Firm — James G. Passé; Passé Intellectual Property, LLC

(57) ABSTRACT

The present invention relates to a device and method of training a child not to cry by providing a light which dims in response to a child crying and turns back on or brightens when the child stops crying.

7 Claims, 2 Drawing Sheets

TRAINING CHILD NIGHT LIGHT

COPYRIGHT NOTICE

A portion of the disclosure of this patent contains material that is subject to copyright protection. The copyright owner has no objection to the reproduction by anyone of the patent document or the patent disclosure as it appears in the Patent and Trademark Office patent files or records, but otherwise reserves all copyright rights whatsoever.

BACKGROUND OF THE INVENTION

Field of the Invention

The present invention relates to a device for training children not to cry. In particular, it relates to a light which dims when a child cries and brightens when they don't, to encourage children who like night lights to not cry.

Description of Related Art

The use of a night light in a child's room is very common. While some children can have the light extinguished after they go to sleep, many, if not most, require the light to be on all night long. The child feels it is comforting and creates a safe space for them to sleep in without adults or guardians in the room.

Children, early on, cry for food or to be changed, but as they get older the crying is just for attention and frequently requires someone to check on the child to help the child stop crying. This encourages continued crying and gets very difficult for the adult who needs to get up during the process. Many methods are used to stop a child from crying, including letting them cry and just plain waiting till they stop as they get older. For some, this is neither practical nor effective. New methods for stopping children from crying during the night are desperately needed.

BRIEF SUMMARY OF THE INVENTION

The present invention is the discovery of a method and device for training children to stop crying, especially those that also utilize a night light. In the present invention, a child's night light is fitted with a dimming circuit that engages if it senses a child crying, thus if a child cries the light dims, but if the child remains quiet the light remains on, or brightens if it had previously dimmed. Since the child will want the night light on, the child learns if they don't cry the night light stays on.

Accordingly, in one embodiment, there is a light for use in training a child not to cry comprising:
  a) a light dimming circuit;
  b) an audio sensor designed to detect the sound of a child crying; and
  c) a connecting circuit for using the dimming circuit to dim the light when the audio sensor detects a child crying and turning the light up after a period of time when no crying is sensed by the audio sensor.

In yet another embodiment, there is a method of training a child not to cry at night using a night light the method comprising:
  a) engaging an audio sensor that detects when the child is crying;
  b) when the audio sensor detects the child is crying, sending a signal to a dimming circuit on the night light which instructs the dimming circuit to lower the light intensity; and
  c) engaging a timer to time how long it has been since the child was last crying and increasing the light intensity once a selected time is reached.

DETAILED DESCRIPTION OF THE INVENTION

Figure 1:
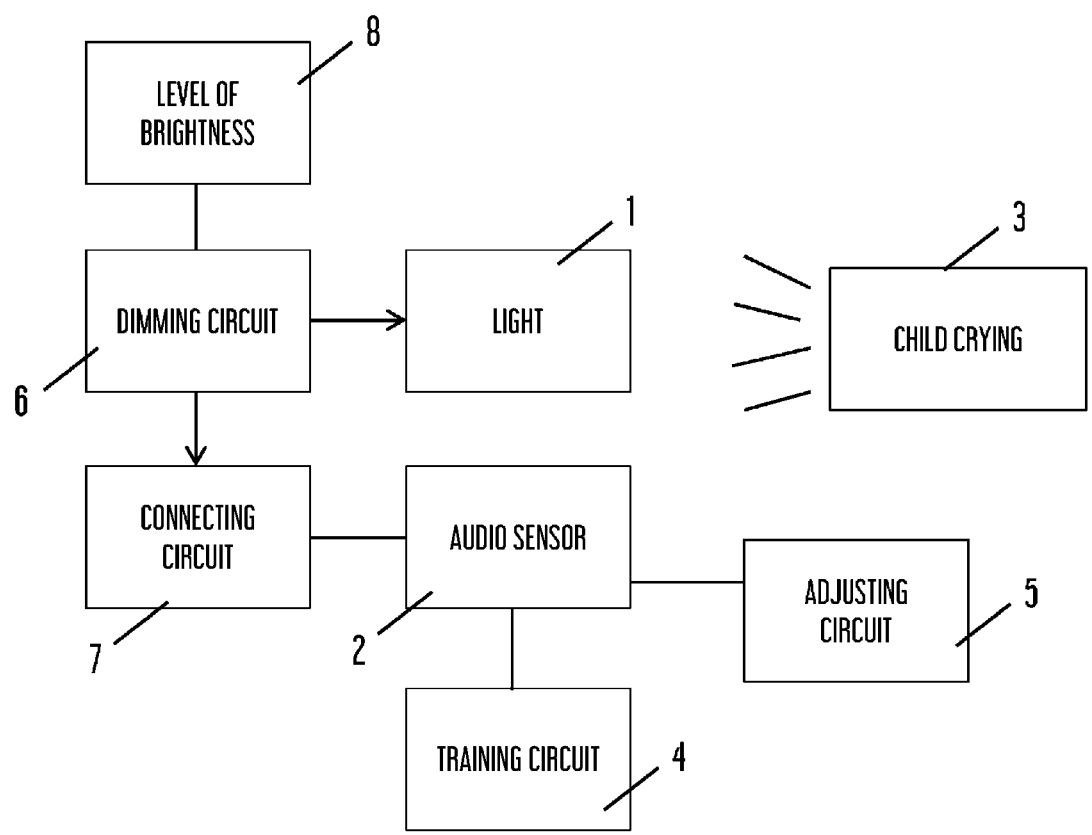
FIG. 1 is a diagram of the present invention.

While this invention is susceptible to embodiment in many different forms, there is shown in the drawings, and will herein be described in detail, specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. This detailed description defines the meaning of the terms used herein and specifically describes embodiments in order for those skilled in the art to practice the invention.

Definitions

The terms "about" and "essentially" mean ±10 percent.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

The term "comprising" is not intended to limit inventions to only claiming the present invention with such comprising language. Any invention using the term comprising could be separated into one or more claims using "consisting" or "consisting of" claim language and is so intended.

References throughout this document to "one embodiment", "certain embodiments", and "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are for the purpose of illustrating certain convenient embodiments of the present invention, and are not to be considered as limitation thereto. The term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "baby" refers to a baby or young child in a room at night. The child is one that still cries at night, but is old enough to be trained about crying. The minimum age will vary from child to child, but in one embodiment the child is at least 3 months old.

As used herein, the term "light" refers to a battery or electric operated light in a child's room designed to be kept on while the child sleeps. A night light that plugs into the wall, a lamp, or a ceiling light are all included depending on what a child uses in their room as a night light.

As used herein, the term "cry" refers to a child weeping, shedding tears, or the like, accompanied by some sound that accompanies the actions. Because a child's cry is very pitch definite, it is possible to use an audio sensor that is only tuned to those higher frequencies associated with a child crying. In one embodiment, the cry is any sound above a certain decibel. In another embodiment, the audio sensor is tuned to a particular child's individual cry. In general, any noise the child makes could constitute a cry so, for example, if the child is playing with a toy late at night and making sounds this could be considered a cry.

As used herein, the term "dimming circuit" refers to an AC or DC circuit which reduces electrical current to a light and thus, reduces the light output of the light. It can be a simple on/off switch, a rheostat type dimming, or some form of step dimming, so that multiple steps occur before the light is all the way off. It also refers to being able to reverse the dimming process, thus brightening the light in the same or similar manner to the dimming of the light, the brightening could be controlled by a timer (e.g. so many minutes or seconds after crying stops or any other method). While the circuits of the present invention could be separate chips, devices, or the like, in one embodiment the circuits are all on one chip and, in a further embodiment, the chip is connected to the light.

As used herein, the term "connecting circuit" refers to an electronic circuit that coordinates information from an audio sensor and the dimming switch. It lets the dimming circuit know that the audio sensor has or has not received information that would cause the dimming circuit to operate, either dimming or brightening the light.

As used herein, the term "audio sensor" refers to a circuit that detects sound near the child. In one embodiment, it is any sound over a certain decibel level. In other embodiments, it is tuned to pitch, the length of the sound, or the time there has been no sound. In one embodiment, it is designed to be tuned to an individual child's crying, thus ignoring any sound which is not the child's.

DRAWINGS

Now referring to the drawings, FIG. 1 is a diagram of the device of the present invention connected to light 1. In this figure, an audio sensor 2 is positioned where it can detect a child crying 3. The audio sensor can have a training circuit where it learns the child's crying voice or general sound 4 and/or can have an adjustment circuit 5 which allows the sensor to detect based on sound intensity, frequency, type and duration of the sound detected before engaging the dimming circuit 6 using the connecting circuit 7. The dimming circuit 6 can keep track of levels of brightness 8 in steps in a continuous manner or simply an on/off manner. Controlling the light intensity up or down as determined by whether it is detecting sound, and dimming the light down when detecting a sound or, if no sound has been detected in the timeframe, turning the light up.

Figure 2:
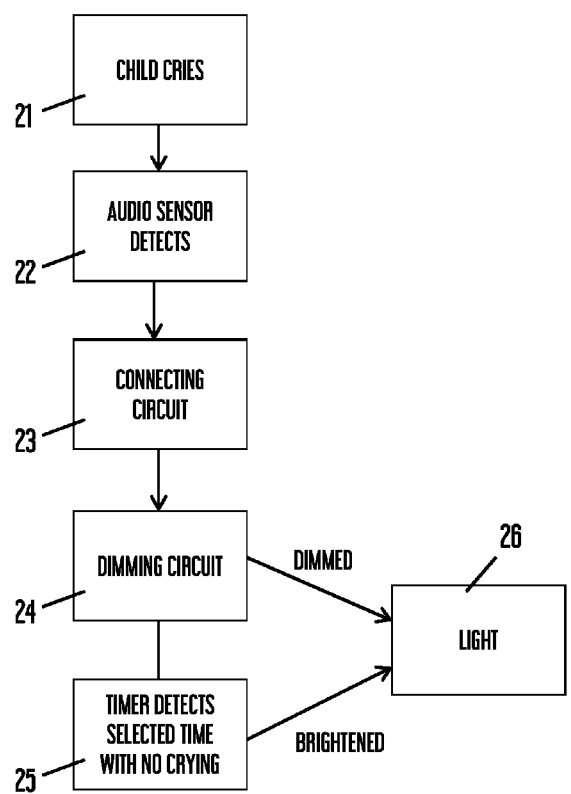
FIG. 2 is a flowchart of the method of the present invention.

FIG. 2 depicts the method of the present invention for teaching a child not to cry at night in a dark room. In the present method, when a child cries 21 an audio sensor detects the child crying 22. A connecting circuit 23 then transfers information when crying is detected to the dimming circuit 24 which then dims light 26. A timer is engaged with a time selected for a time period with no detected crying 25, and after that no crying time period is achieved the light is brightened back up.

Those skilled in the art to which the present invention pertains may make modifications resulting in other embodiments employing principles of the present invention without departing from its spirit or characteristics, particularly upon considering the foregoing teachings. Accordingly, the described embodiments are to be considered in all respects only as illustrative, and not restrictive, and the scope of the present invention is, therefore, indicated by the appended claims rather than by the foregoing description or drawings. Consequently, while the present invention has been described with reference to particular embodiments, modifications of structure, sequence, materials and the like apparent to those skilled in the art still fall within the scope of the invention as claimed by the applicant.

What is claimed is:

1. A night light for use in sleep training a child who sleeps with the night light on comprising:
   a) a light dimming circuit;
   b) an audio sensor designed to detect the sound of the child; and
   c) a connecting circuit for using the dimming circuit to dim the light when the audio sensor detects the child sound and turning the light up after a period of time when no child sound is sensed by the audio sensor.

2. The light according to claim 1 wherein the audio sensor is trained to detect a particular child's sound.

3. The light according to claim 1 wherein the dimming circuit dims the light in steps, including turning the light off.

4. The light according to claim 1 wherein the connecting circuit is adjustable for at least one of time, length of sound, and sound intensity.

5. A method of training a child to be quiet at night while using a night light, the method comprising:
   a) engaging an audio sensor that detects when the child is making a sound;
   b) when the audio sensor detects sound, sending a signal to a dimming circuit on the night light which instructs the dimming circuit to lower the light intensity; and
   c) engaging a timer to time how long it has been since the sound was detected and increasing the light intensity once a selected time is reached.

6. A night light for use in sleep training a child who sleeps with the night light on comprising:
   a) a light dimming circuit;
   b) an audio sensor designed to detect sound above a selected decibel; and
   c) a connecting circuit for using the dimming circuit to dim the light when the audio sensor detects the sound above the selected decibel level and turning the light up after a predetermined period of time when no sound detected above the selected decibel level is sensed by the audio sensor.

7. The night light according to claim 6 wherein the night light dims in stages until the light is off.

* * * * *